United States Patent [19]

Takasaki et al.

[11] Patent Number: 5,331,482
[45] Date of Patent: Jul. 19, 1994

[54] CAM ARRANGEMENT FOR CASSETTE LOADING MECHANISM HAVING REDUCED SLIPPAGE

[75] Inventors: Saburo Takasaki; Eiji Ohshima, both of Kanagawa, Japan

[73] Assignee: Sony Corporation, Japan

[21] Appl. No.: 887,057

[22] Filed: May 22, 1992

[30] Foreign Application Priority Data

May 31, 1991 [JP] Japan .................. 3-129152

[51] Int. Cl.$^5$ .................. G11B 5/027; G11B 15/00
[52] U.S. Cl. .................. 360/85; 360/95
[58] Field of Search .................. 360/84–85, 360/95; 74/110, 503, 567, 569

[56] References Cited

U.S. PATENT DOCUMENTS

| | | | |
|---|---|---|---|
| 3,688,055 | 8/1972 | Inaga et al. | 360/85 |
| 4,092,686 | 5/1978 | Schulz | 360/85 |
| 4,611,251 | 9/1986 | Yokoo | 360/85 |
| 4,727,441 | 2/1988 | Tsuchida et al. | 360/85 |
| 4,730,225 | 3/1988 | Kishimoto et al. | 360/85 |
| 4,899,235 | 2/1990 | Kano et al. | 360/85 |
| 4,956,732 | 9/1990 | Moriyama | 360/85 |
| 5,014,140 | 5/1991 | Nishida et al. | 360/85 |

FOREIGN PATENT DOCUMENTS 0131413  1/1985  European Pat. Off. .

*Primary Examiner*—A. J. Heinz
*Assistant Examiner*—Brian E. Miller
*Attorney, Agent, or Firm*—Ronald P. Kananen

[57] ABSTRACT

A cam arrangement for a cassette loading mechanism includes a sliding chassis, slidingly mounted on a fixed chassis. When the chassis slides in one direction a cam pin is moved along a cam surface of a fixed cam provided on the fixed chassis to a second cam surface provided on a movable cam mounted to the movable chassis. Proximate a return side of an end of the first cam surface a return cam is provided such that, should misalignment occur between the first and second cam surfaces during tape loading or unloading operation, the cam may be returned to an initial position automatically.

27 Claims, 8 Drawing Sheets

CAM ARRANGEMENT FOR CASSETTE LOADING MECHANISM HAVING REDUCED SLIPPAGE

BACKGROUND OF THE INVENTION

1. Field of The Invention

The present invention relates generally to a cam arrangement, particularly to a cam arrangement which can be employed in a loading/unloading mechanism of an apparatus utilizing cassettes, such as a VTR, for example.

2. Description of The Prior Art

The functioning of a conventional cam arrangement for a Video Tape Recorder (VTR) will be explained with reference to FIG. 7. As seen in the drawing, a fixed portion 101 is engaged with a slidably installed portion, or sliding chassis, 102. A fixed cam member 103 and a movable cam member 104 are affixed to the sliding chassis 102 and the fixed portion 101 respectively. The fixed cam member 103 is provided with cam surfaces 105 and the movable cam 104 is provided a cam surface 106. A cam pin 107 pivotably mounting a movable arm, or tensioning arm, 109 is provided, movable along the cam surfaces 105 and 106. The cam pin 107 is associated with a coil spring 108 which urges the tensioning arm 109. The tensioning arm 109 is movable along the cam surface 105 of the fixed cam to the cam surface 106 of the movable cam 104. The tensioning arm 109 is moved according to rotation of the movable cam 104 and comprise a portion of a tension regulator for a VTR, for example.

According to the above, a tension regulator arrangement typically comprises a fixed chassis, with a fixed cam and a movable cam installed thereon, and a sliding chassis with a tensioning arm installed thereon for movement with the sliding chassis.

As applied to operation in a VTR, the sliding chassis is associated with a cassette holder for accepting a cassette tape cartridge therein. According to pushing force applied to the cassette holder, the sliding chassis slides, causing the cam pin to move along the cam surface of the fixed cam. This in turn causes the tensioning arm to rotate and draw a portion of tape from the tape cassette.

Further, after the movement of the cam pin along the surface of the fixed cam reaches the cam surface of the movable cam the sliding of the slidable chassis is stopped. Tape angle guides, associated with the supply and take-up reels of the cassette disposed on the sliding chassis, are movable to wind the tape around an outer surface of a rotatable head drum at a predetermined winding angle. Thereafter the movable cam rotates to cause the tensioning arm to move to effect adjustment of tape tensioning.

In such conventional cam arrangements, the movement of the cam pin is determined along the cam surface of the fixed cam to the cam surface of the movable cam, and the tensioning effected by the tensioning arm is dependent upon motion transmitted by the rotating movement of the movable cam. However, due to the mechanical characteristics of the arrangement, slippage may occur between the movable cam and the tensioning arm which may cause misoperation, especially at a point where a cam pin associated with the tensioning arm moves from the cam surface of the movable cam to the cam surface of the fixed cam. This can cause the cam pin to become jammed as seen in FIG. 8. This is especially true of portable cassette units, for example, which may be subject to accidental jarring or shocks during use.

Therefore, it has been required to provide a tape tensioner which may avoid such a condition to compensate for such slippage and provide reliable tape loading and tensioning.

SUMMARY OF THE INVENTION

It is therefore a principal object of the present invention to provide a cam arrangement which avoids the drawbacks of the prior art.

In order to accomplish the aforementioned and other objects, a cam arrangement is provided, comprising: first and second relatively movable portions, a fixed cam associated with one of the first or second portions the fixed cam including a first cam surface with a gap formed therein; a movable cam associated with the other of the first or second portions, the movable cam having a second cam surfaces aligning with the cam surface of the fixed cam according to a predetermined positional relation therebetween, spring means mounted at one end thereof to the portion mounting the movable cam, an arm portion rotatably mounted on the portion other than that mounting the spring means, the arm portion being connected to another end of the spring means and provided with a cam pin contacting the cam surfaces of the fixed and movable cams and urged by the spring means, and return means for returning the cam pin to the first cam surface via the gap whenever the cam pin is dislodged from one of the cam surfaces due to non-alignment between the aligning portions thereof.

According to another aspect of the present invention, a cam arrangment comprises; a first chassis member, a second chassis member, slidably disposed on the first chassis member for movement relative thereto a fixed cam mounted on the first chassis member, the fixed cam including first and second cam surfaces each having engage and return sides respectively, the first and second cam surfaces defining a first gap therebetween, a movable cam rotatably mounted on the first chassis member, the movable cam including a third cam surface having engage and return sides thereof, the third cam surface being alignable with the second cam surface so as to be contiguous therewith according to a predetermined positional relationship between the cam arrangement, the second and third cam surfaces defining a second gap therebetween according to occurrence of a non-aligned positional relationship therebetween a tensioning member, mounted on the second chassis member, spring biased in one direction and rotatable according to movement of the movable cam, the tensioning member associated with a cam pin, the cam pin moving along an engage side of the first, second and third cam surfaces according to sliding movement of the sliding chassis in a first direction and moving along a return side of the third second and first cam surfaces according to movement of the sliding chassis in a second direction opposite the first direction, a return cam surface positioned adjacent a return side of the second cam surface, the cam pin being positioned proximate the return cam surface by the spring biasing in the one direction, in the presence of the second gap, and a return cam, associated with the return cam surface, the cam pin, in the presence of the second gap, moving along the return cam surface and along the return cam, the return cam having a terminal end at the first gap.

DESCRIPTION OF THE PREFERRED EMBODIMENT

Figure 1:
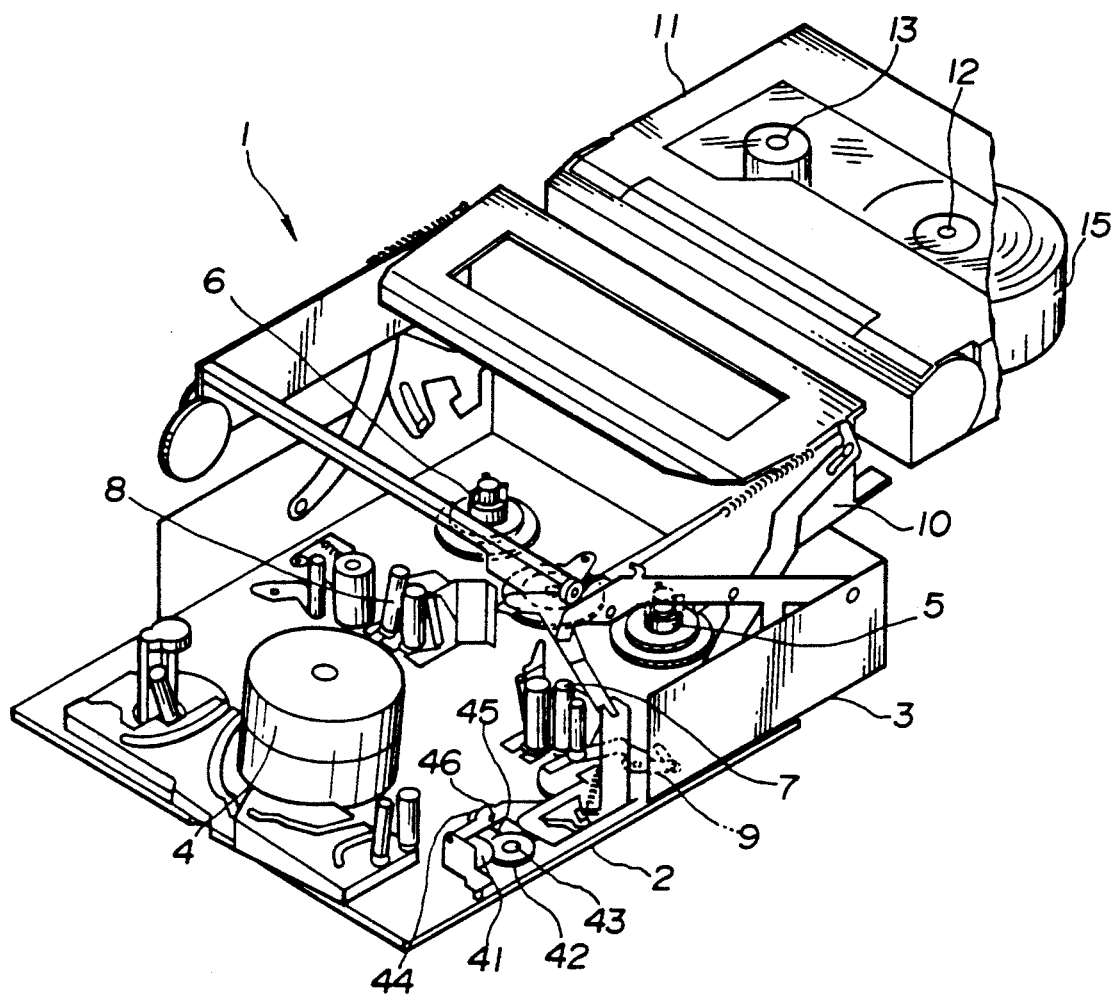
FIG. 1 is a partially cut-away perspective view of a cassette loading apparatus to which the cam arrangement of the present invention is applicable.

Referring now to the drawings, particularly to FIG. 1, a first embodiment of the invention as applied to a VTR tape tensioning apparatus will be explained hereinbelow.

Referring to FIG. 1, numeral 1 indicates a pop-up VTR loading arrangement including a fixed chassis 2 on which a movable, or sliding chassis 3 is slidably disposed. A rotatable head drum 4 is also installed on the fixed chassis 2. Further, on the sliding chassis 3, a supply capstan 5, a take up capstan 6, and tape angle guides 7 and 8 are provided. The tape angle guides 7 and 8 are associated with the supply capstan 5 and the take-up capstan 6, respectively. Also provided on the sliding chassis 6 are a tensioning arm 9 and a cassette holder 10.

A tape cassette 11 may be inserted into the cassette holder 10. The tape cassette includes a supply reel 12 and a take-up reel 13 on which tape 15, which may be magnetic tape, for example, is wound.

Figure 2:
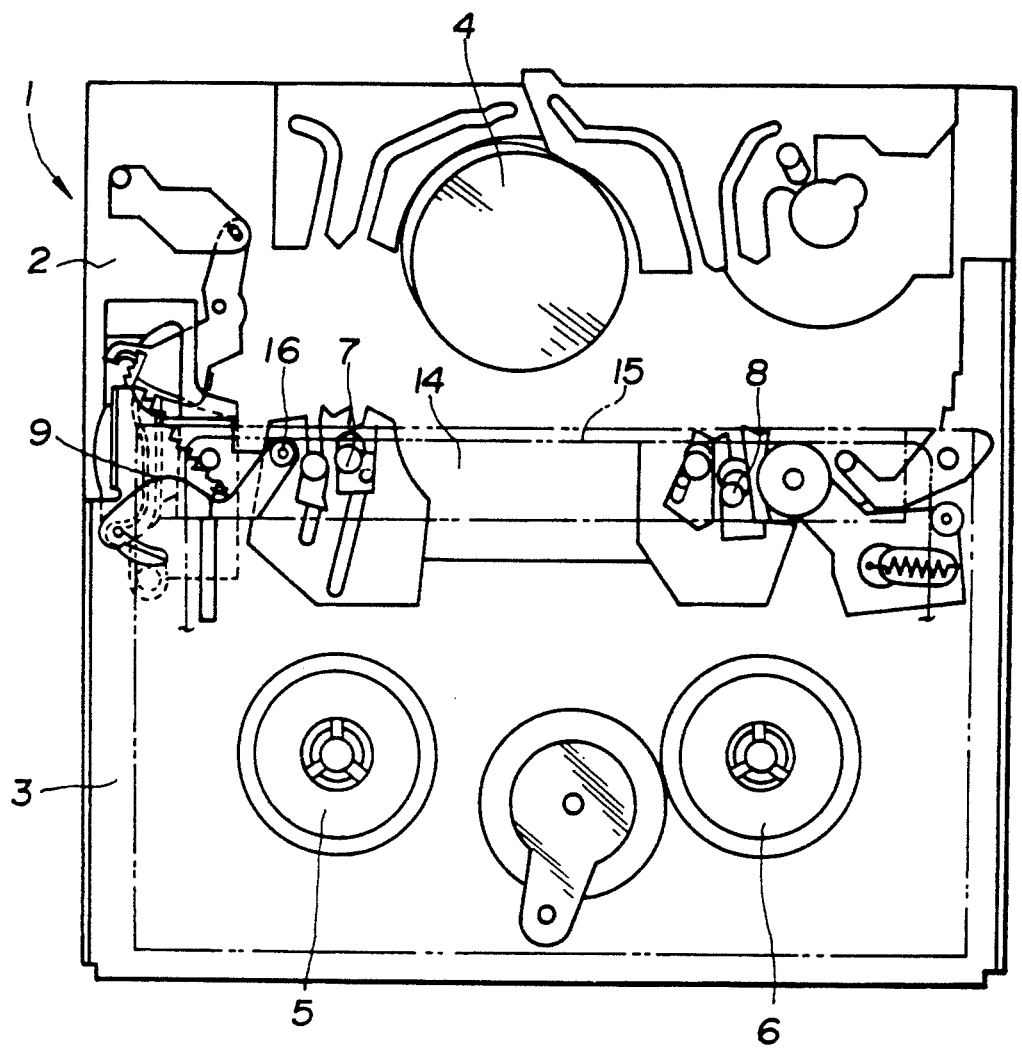
FIG. 2 is a plan view of the cassette loading apparatus of FIG. 1 including a tape cassette shown in an unloaded condition.

Referring to FIG. 2, the tape cassette 11 further includes a tape insert portion 14. The tape angle guides 7 and 8 as well as a tape pin 16, associated with an end portion of the tensioning arm 9 access the cassette 11 for positioning the tape for operably loading the cassette 11.

When the tape is thus positioned, the sliding chassis 3 is operable to slide in the direction of the rotatable head drum 4. In this position the cam arrangement of the invention is operable to move the tensioning arm 9 so as to extract the tape 15 from the cassette 11 as will be explained hereinbelow.

When the sliding chassis 3 reaches its terminal position in the direction of the head drum 4, the tape angle guides 7 and 8 further move in the direction of the rotatable head drum 4 for winding the tape 15 around the head drum 4 at the correct winding angle. Thereafter, tape tensioning control is effected by the tensioning arm 9 of the cam arrangement. The operation of the cam arrangement will be explained with reference to FIGS. 3 to 5.

Figure 3:
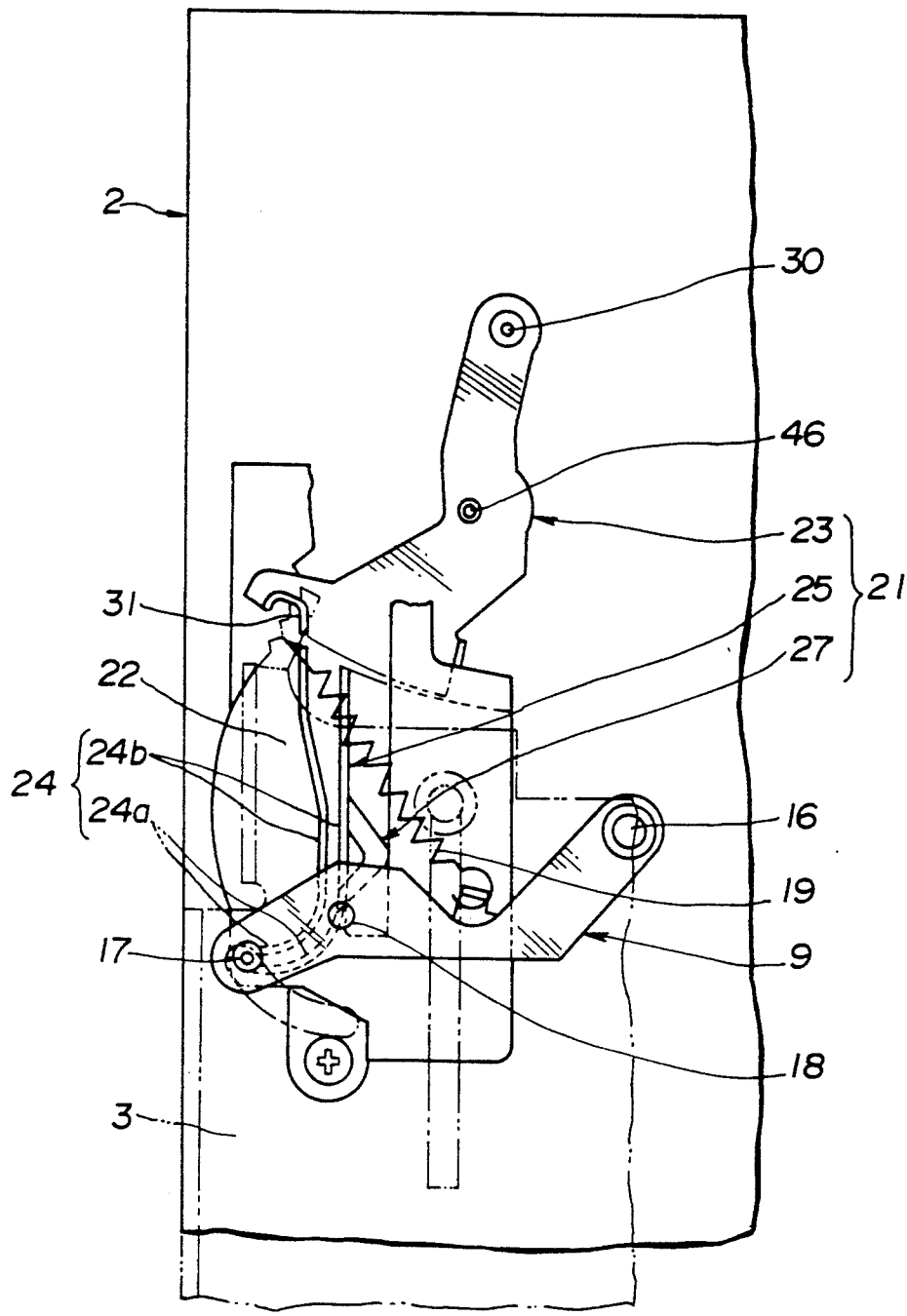
FIG. 3 is a plan view of a cam arrangement in an initial position of a sliding chassis thereof according to a first embodiment of the invention.

As seen in FIG. 3, one side of the tensioning arm 9 is provided with a tape pin 16. Another end of the tensioning arm 9 is connected to a cam pin 17. Between the tape pin 16 and the cam pin 17 an axis 18 rotatably mounts the tensioning arm 9 to the sliding chassis 3. Further, a coil spring 19 urges the rotatably mounted tensioning arm 9 in the counterclockwise direction.

Next, the operation of the cam arrangement 21 will be described with reference to the drawings.

The cam arrangement 21 comprises a fixed cam 22 associated with the fixed chassis 2, which includes a cam surface 24, as well as a return cam 27, associated with a return cam surface 25 for guiding the cam pin 17 of the tensioning arm 9 back to the cam surface 24.

The cam surface 24 of the fixed cam 22 is comprised of a first cam surface 24a, shown as a dotted line in FIG. 3. The first cam surface is approximately U-shaped comprising left and right sides (as viewed in the drawings) and a U-shaped bottom portion and second cam s surfaces 24b, contiguous with the left and right sides of the first cam surface 24a. The cam surfaces 24b are shown as a solid line in FIG. 3. As the sliding chassis 3 slides in downward direction of FIG. 3, the tensioning arm 9, which is rotatable mounted on the sliding chassis 3, is urged in the counter-clockwise direction with the cam pin 17 contacting the cam surface 24a to dispose the tensioning arm at a predetermined angle.

The movable cam 23 is mounted at one end thereof on an axis 30 affixed to the fixed chassis 2 and, at another end thereof, is provided with a third cam surface 31 which is proximate a terminal end of the cam surface 24b of the fixed cam 22.

Figure 4:
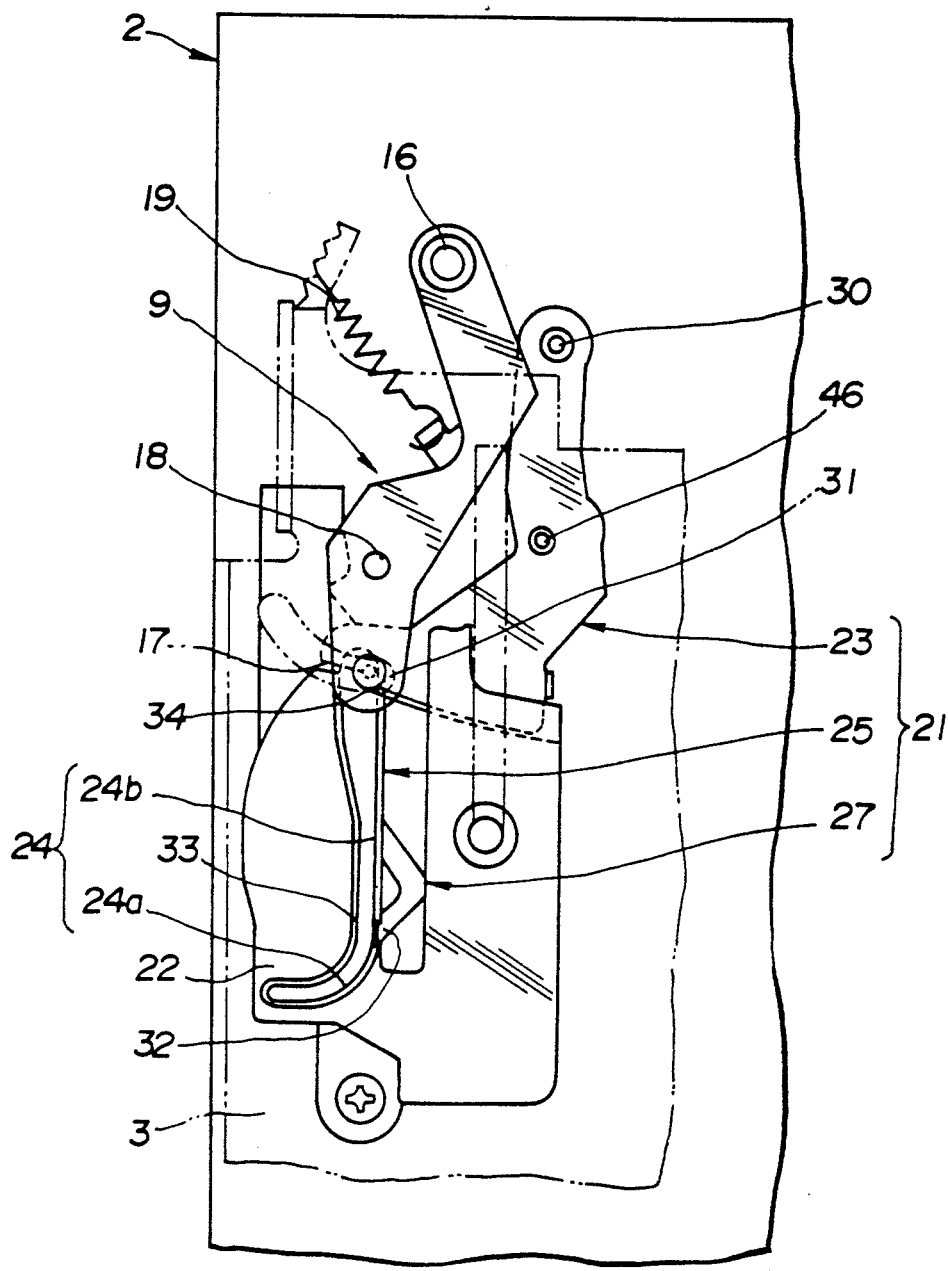
FIG. 4 is a plan view of the cam arrangement of FIG. 3 in a terminal position of the sliding chassis thereof invention.

As seen in FIG. 4, during a tape loading operation, the above-mentioned cam pin 17 moves along the left hand side of the first cam surface 24a to the left side of the second cam surface 24b to the third cam surface 31 according to rotation of the movable cam 23. This action moves the tensioning arm 9 so as to move the tape pin 16, thus extracting a length of the tape 15 from the tape cassette 11 for tensioning of the tape 15.

The return cam 27 is formed substantially between the return cam surface 25 and an edge portion 26 of the fixed cam, which opposes the return cam surface 25. That is to say, the surface defined between the return cam surface 25 and the edge portion 26 is at a lower elevation than the plane of the cam surfaces, 24 and 31, and a cam groove is formed therein for defining the return cam 27. Further, at a lower end of the return cam 27, as seen in FIG. 3, where the return cam 27 leads back to the cam surfaces 24, a first gap 32 is defined between the first cam surface 24a and the second cam surface 24b. The gap 32 is wide enough to admit the cam pin 17 and is covered with a spring member 33 which may be of a plate spring material such as spring steel, for example. The spring member is openable in one direction such that the cam pin 17 may pass from the return cam 27 to the first cam surface 24a, but not in the opposite direction. The operation of this arrangement will be explained more fully hereinlater.

A second gap 34, is defined between the third cam surface 31 and the second cam surface 24b. This gap is normally closed by movement of the movable cam to bring the left side of the second cam surface 24b into close proximity with the left side of the inverted U-shaped third cam surface 31 at a time when the cam pin 17 travels from the second cam surface 24b to the third cam surface 31, and when the cam pin 17 travels back from the right side of the third cam surface 31 to the right side of the second cam surface 24b.

Referring again to FIG. 1, when the sliding chassis 3 slides in the direction of the rotating head 4, the tape angle guides 7 and 8 are moved by a tape loading motor 5 (not shown in the drawings) via a gear train consisting of a first gear 41, a second gear 42, a third gear 43, and a fourth gear 44, consecutively arranged.

Furthermore, a cam pin 46 is provided on the movable cam 23, engaged with a cam groove 45 provided in the upper surface of the fourth gear 44. Thus the movable cam 23 is moved according to rotation of the fourth gear, due to the engagement between the pin 46 and the cam groove 45.

Referring to FIG. 3, the above mentioned cam arrangement 21 functions thusly; according to the rotation of a drive motor (not shown) in one direction, the gear train is effective to slide the sliding chassis 3 in a direction toward the rotating head drum 4, moving the cam pin 17 along the first cam surface 24a and the tensioning arm 9 is rotated in the counterclockwise direction. As the sliding chassis continues its sliding motion the cam pin 17 moves to the second cam surface 24b and along the second cam surface 24b to the third cam surface 31 at which point the sliding motion of the sliding chassis 3 is stopped.

Only when the sliding chassis 3 reaches its terminal position to be fixed thereat, do the tape angle guides 7 and 8 move to wind the tape 15 around the rotary head drum 4. After the tape 15 has been wound around the head drum 4, the tensioning arm 9 is positioned by the movable cam 23 so as to maintain appropriate tape tension.

In tape unloading, the above sequence is reversed according to rotation of the driving motor in the opposite direction.

Figure 5:
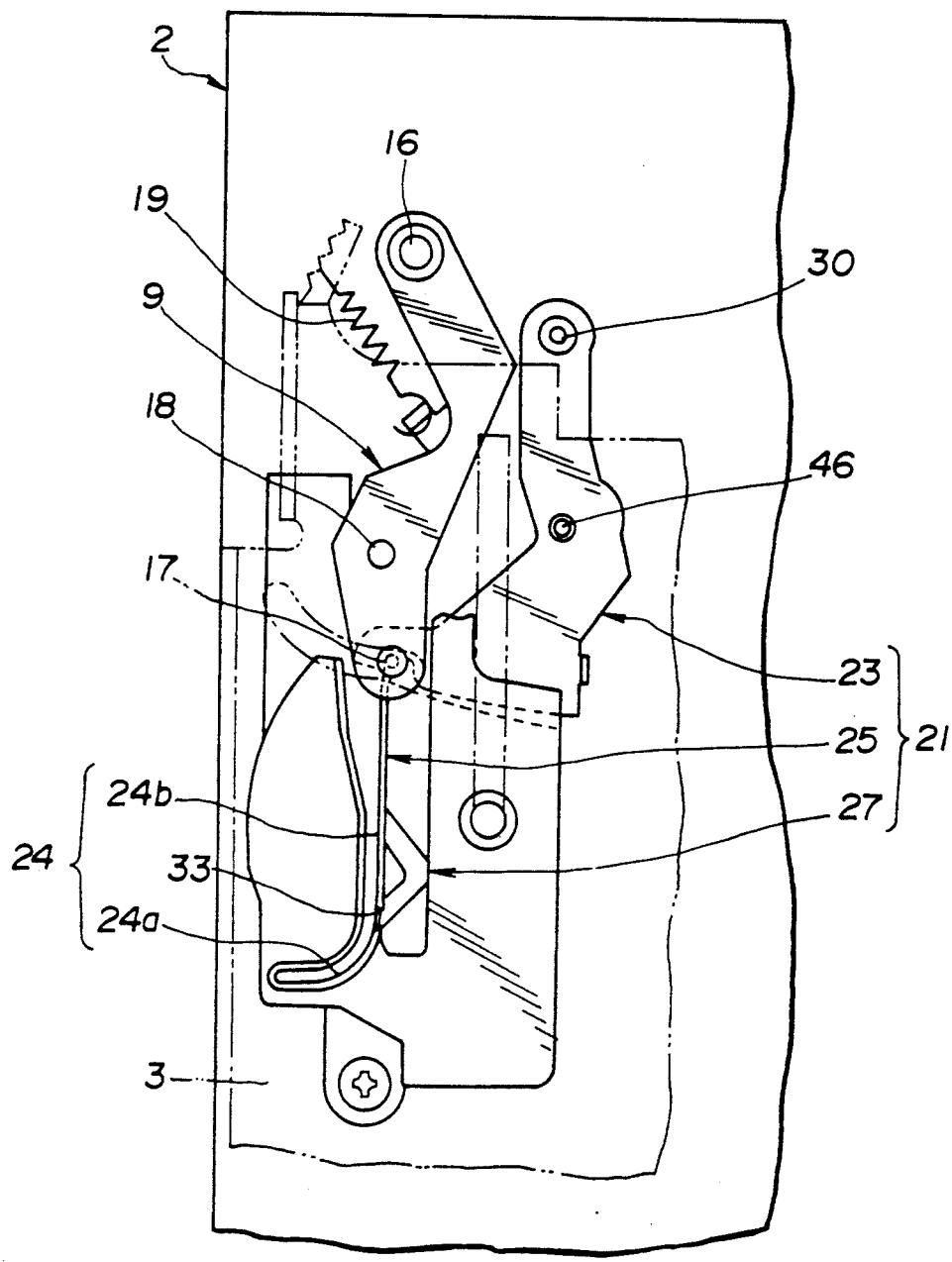
FIG. 5 is a plan view showing rotational movement of a rotatable cam and tensioning arm of the cam arrangement of FIGS. 3 and 4.

However, when the cam pin 17 moves along the second cam surface 24b to the third cam surface 31, or when the cam pin 17 moves from the third cam surface 31 to the second cam surface 24b, if the gap 34 is present therebetween due to slippage between the mechanical members, for example, such that the cam pin is disengaged from both cam surfaces, the spring force of the coil spring 19 rotates the tensioning arm 9 counterclockwise so as to position the cam pin 17 as seen in FIG. 5.

That is, the cam pin is positioned at the side of the return cam surface 25, opposed to the right side of the second cam surface 24b, and the sliding chassis may freely slide away from the rotating head 4 causing the cam pin 17 to move in the downward direction (of the drawings) along the return cam surface 25 to the groove forming the return cam 27 to guide the cam pin outward of the return cam surface 25 and guided back toward the spring member 33 covering the first gap 32 so as to push the cam pin against the spring member at such an angle as to allow the cam pin 17 to pass by the spring member so as to be returned to the side of the first and second cam surfaces 24a and 24b. As noted above, the spring member 33 is arranged such that the cam pin 17 may not pass by the spring member 33 in the opposite direction.

Figure 6:
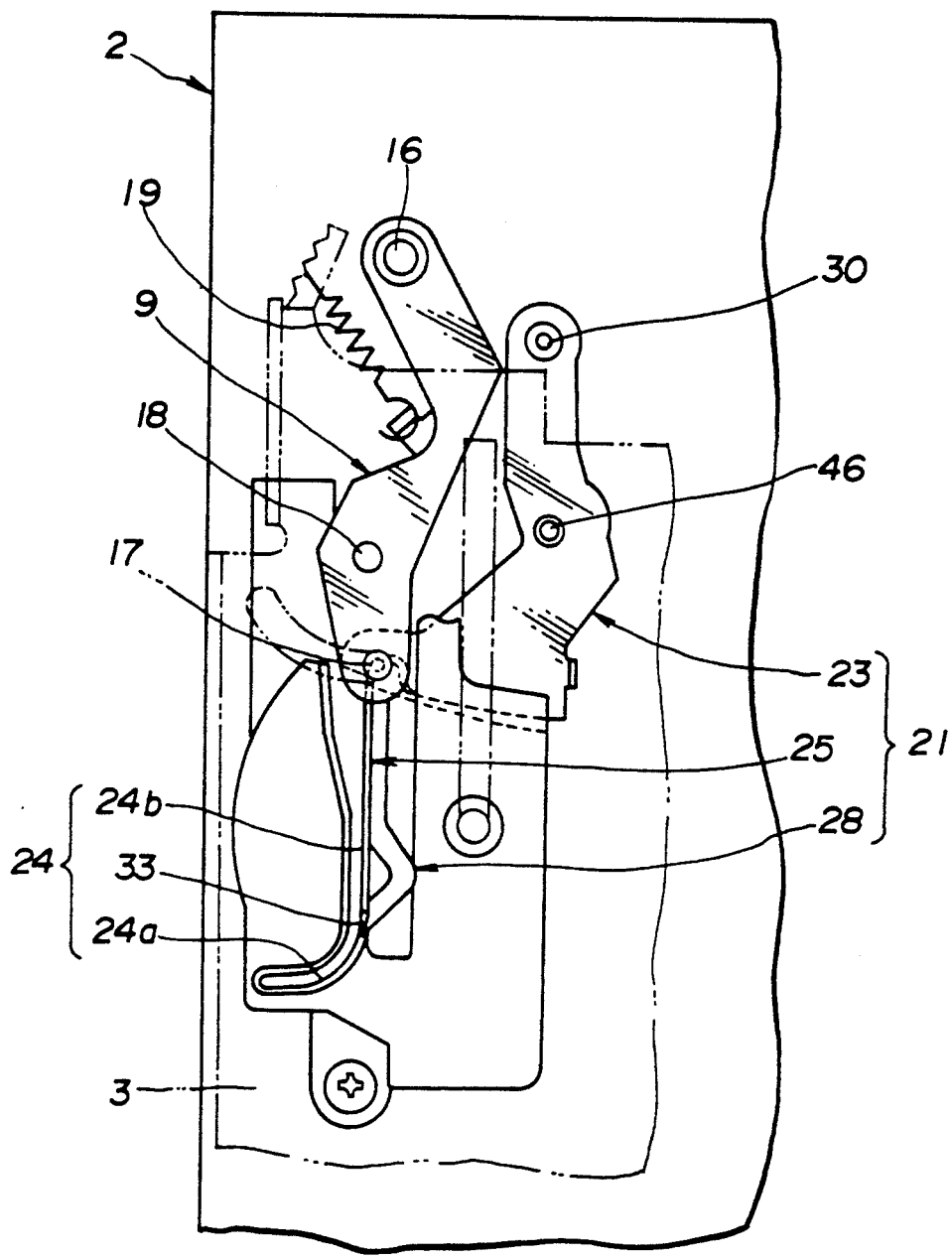
FIG. 6 is a plan view showing a second embodiment of the cam arrangement of the invention.
Figure 7:
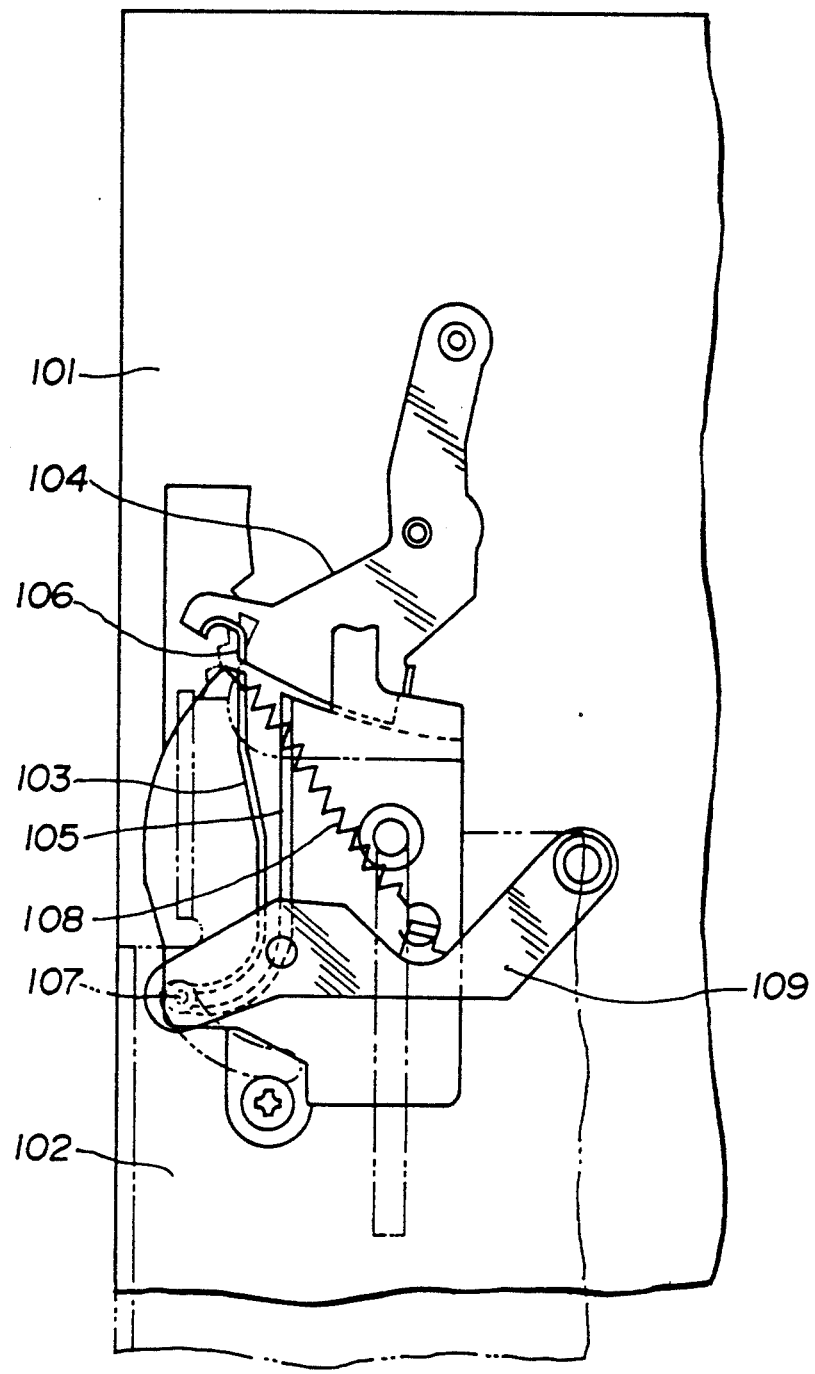
FIG. 7 is a plan view showing a conventional cam arrangement for a VTR in an initial position of a sliding chassis thereof.
Figure 8:
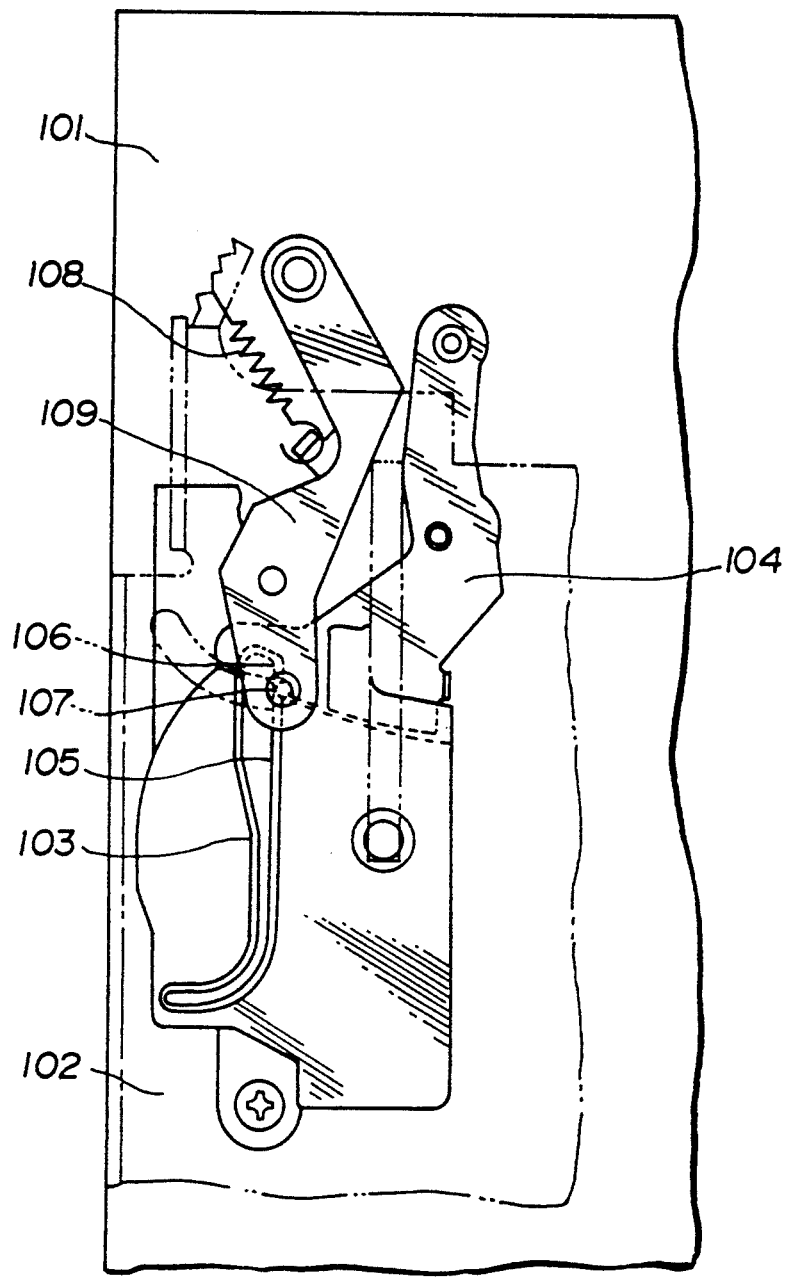
FIG. 8 is a plan view showing the conventional cam arrangement of FIG. 7 in a terminal position of the sliding chassis thereof.

FIG. 6 shows a second embodiment of the invention. This embodiment differs from the first embodiment only in that a return cam 28 is provided in which the groove for guiding the cam pin 17 is extended along the return cam surface 25 to the upper end thereof. In other respects the operation of the second embodiment is identical to the above-described first embodiment.

Thus, in case of misloading operation, or in case of incorrect alignment between the third cam surface 31 and the second cam surface 24b during loading or unloading, which may be caused by impact or dropping of the apparatus, or other such occurrence, for example, the cam pin may always be automatically returned to its initial position such that the sliding chassis 3 may again slide toward the rotatable head drum 4 to achieve smooth loading and unloading operation with reliable tape tensioning. Further, according to the invention, small impacts or accidents which may affect portable cassette units, for example, may be sustained without need of professional repair and durability of the reliability of such apparatus may be considerably enhanced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A cam arrangement for a video cassette recorder comprising:

first and second relatively movable portions;

a fixed cam operatively coupled with one of said first or second portions, said fixed cam including a first cam surface with a gap formed therein;

a movable cam rotatably mounted on the relatively movable portion mounting said fixed cam, said movable cam having a second cam surface aligning the cam surface of said fixed cam according to a predetermined positional relation therebetween;

a spring mounted at one end thereof to a portion other than that mounting said fixed and movable cams;

an arm portion rotatably mounted on the portion mounting said spring means, said arm portion being connected to another end of said spring means and provided with a cam pin contacting said cam surfaces of said fixed and movable cams and urged by said spring means; and return means, formed in said relatively movable portion mounting said fixed and movable cams, said return means returning said cam pin to said first cam surface via said gap whenever said cam pin is dislodged from one of said cam surfaces;

wherein said return means comprises a return cam, said return cam having an initial end of a cam surface thereof proximate a position where said alignment occurs between said first and second cam surfaces, and having a terminal end thereof at said gap in said first cam surface.

2. A cam arrangement as set forth in claim 1, wherein said return means is operable in one direction only.

3. A cam arrangement as set forth in claim 1, wherein said initial end of said surface of said return cam is located on a side of said aligning first and second cam surfaces in which said arm portion is urged by said spring means.

4. A cam arrangement as set forth in claim 1, wherein said return cam includes a groove substantially parallel to said first cam surface thereof.

5. A cam arrangement as set forth in claim 1, further including access means disposed across said gap for permitting passage of said cam pin from a side of said return cam to a side of said first cam surface.

6. A cam arrangement as set forth in claim 5, wherein said access means opens in only one direction.

7. A cam arrangement as set forth in claim 5, wherein said access means comprises a plate of spring steel.

8. A cam arrangement as set forth in claim 1, wherein said cam arrangement is an operative portion of a loading mechanism of a data read/write apparatus.

9. A cam arrangement as set forth in claim 1, wherein said first and second portions are first and second chassis members of a data read/write apparatus, said second chassis member being slidably mounted on said first chassis member.

10. A cam arrangement as set forth in claim 9, wherein a recording medium of said data read/write apparatus is magnetic tape, an arm portion of said cam arrangement being further provided with a tape pin and providing tape tensioning for said magnetic tape.

11. A cam arrangement as set forth in claim 10, wherein said magnetic tape is housed in a cassette, said arm portion of said cam apparatus being movable to provide tensioning for said magnetic tape when said cassette is in a loaded condition in said data read/write apparatus.

12. A cam arrangement as set forth in claim 10, wherein said chassis member mounting said arm portion further mounts a tape guide mechanism and a pair of capstans rotatable of reels holding said magnetic tape, said tape guide mechanism, associated with said cam arrangement, winding said magnetic tape around a rotary head drum mounted on said second chassis member mounting said fixed and movable cams, for reading and writing data to said magnetic tape, said arm portion moving to provide tensioning for said magnetic tape after said tape guide mechanism winds said magnetic tape around said rotary head drum at a predetermined angle.

13. A cam arrangement as set forth in claim 12, wherein said data read/write apparatus is a VTR.

14. A cam arrangement as set forth in claim 13, wherein said VTR is portable.

15. A cam arrangement for a video cassette recorder comprising:
 a first chassis member;
 a second chassis member, slidably disposed on said first chassis member for movement relative thereto;
 a fixed cam mounted on said first chassis member, said fixed cam including first and second cam surfaces each having engage and return sides respectively, said first and second cam surfaces defining a first gap therebetween;
 a movable cam rotatably mounted on said first chassis member, said movable cam including a third cam surface having engage and return sides thereof, said third cam surface being alignable with said second cam surface so as to be contiguous therewith according to a predetermined positional relationship between said cam arrangement, said second and third cam surfaces defining a second gap therebetween according to an occurrence of a non-aligned positional relationship therebetween;
 a tensioning member, mounted on said second chassis member, spring biased in one direction and rotatable according to movement of said movable cam, said tensioning member operatively coupled with a cam pin, said cam pin moving along an engage side of said first, second and third cam surface according to sliding movement of said second chassis member in a first direction and moving along a return side of said third second and first cam surfaces according to movement of said second chassis member in a second direction opposite said first direction;
 a return cam surface positioned adjacent a return side of said second cam surface, said cam pin being positioned in said second gap and proximate said return cam surface by said spring biasing in said one direction; and
 a return cam formed substantially between said return cam surface and said fixed cam and having a terminal end at said first gap, said cam pin, when in said second gap, moving along said return cam surface and along said return cam.

16. A cam arrangement as set forth in claim 15, further including access means disposed across said first gap for permitting passage of said cam pin from a side of said return cam to a side of said first and second cam surfaces.

17. A cam arrangement as set forth in claim 16, wherein said access means opens in only one direction.

18. A cam arrangement as set forth in claim 16, wherein said access means comprises a plate of spring steel.

19. A cam arrangement as set forth in claim 15, wherein said first and second cam surfaces define a U shape.

20. A cam arrangement as set forth in claim 15, wherein said third cam surface defines an inverted U shape.

21. A cam arrangement as set forth in claim 15, wherein said return cam includes a groove substantially parallel to said return cam surface.

22. A cam arrangement as set forth in claim 15, wherein said cam arrangement is an operative portion of a loading mechanism of a data read/write apparatus.

23. A cam arrangement as set forth in claim 22, wherein a recording medium of said data read/write apparatus is magnetic tape, an arm portion of said cam arrangement being further provided with a tape pin and providing tape tensioning for said magnetic tape.

24. A cam arrangement as set forth in claim 23, wherein said magnetic tape is housed in a cassette, said tensioning member of said cam apparatus being movable to provide tensioning for said magnetic tape when said cassette in a loaded condition in said data read/write apparatus.

25. A cam arrangement as set forth in claim 23, wherein said second chassis member further mounts a tape guide mechanism and a pair of capstans rotatable of reels holding said magnetic tape, said tape guide mechanism, associated with said cam arrangement, winding said magnetic tape around a rotary head drum mounted on said first chassis member for reading and writing data to said magnetic tape, said tensioning member moving to provide tensioning for said magnetic tape after said tape guide mechanism winds said magnetic tape around said rotary head drum at a predetermined angle.

26. A cam arrangement as set forth in claim 25, wherein said data read write apparatus is a VTR.

27. A cam arrangement as set forth in claim 26, wherein said VTR is portable.

* * * * *